(12) United States Patent
Trippe et al.

(10) Patent No.: US 7,648,073 B2
(45) Date of Patent: *Jan. 19, 2010

(54) DATA ACQUISITION DEVICE

(75) Inventors: Gavin Trippe, San Juan Capistrano, CA (US); Steven Saigeon, Camarillo, CA (US); Ronald H. Means, Camarillo, CA (US); Russell G. West, Agoura, CA (US)

(73) Assignee: Market Scan Information Systems, Inc., Camarillo, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 11/961,930

(22) Filed: Dec. 20, 2007

(65) Prior Publication Data

US 2008/0093451 A1    Apr. 24, 2008

Related U.S. Application Data

(63) Continuation of application No. 10/995,841, filed on Nov. 23, 2004, now Pat. No. 7,311,258.

(60) Provisional application No. 60/524,749, filed on Nov. 24, 2003.

(51) Int. Cl.
*G06K 7/10* (2006.01)

(52) U.S. Cl. .................... 235/472.01; 235/487

(58) Field of Classification Search ...............
235/462.01–462.25, 472.01, 472.02, 472.03, 235/383, 492, 487
See application file for complete search history.

(56) References Cited

U.S. PATENT DOCUMENTS

| | | | |
|---|---|---|---|
| 6,745,943 | B2 | 6/2004 | Schlieffers et al. |
| 2001/0034567 | A1* | 10/2001 | Allen et al. .................. 700/283 |
| 2004/0084534 | A1 | 5/2004 | Bhatia et al. |
| 2005/0040242 | A1 | 2/2005 | Beenau et al. |
| 2005/0080649 | A1 | 4/2005 | Alvarez et al. |
| 2005/0139668 | A1* | 6/2005 | Trippe et al. ................. 235/440 |
| 2005/0161504 | A1 | 7/2005 | Ichikawa et al. |
| 2005/0234778 | A1* | 10/2005 | Sperduti et al. ............... 705/22 |
| 2008/0093451 | A1* | 4/2008 | Trippe et al. ................. 235/440 |
| 2008/0105743 | A1* | 5/2008 | Mills .......................... 235/441 |

* cited by examiner

*Primary Examiner*—Thien M Le
(74) *Attorney, Agent, or Firm*—McDermott Will & Emery LLP

(57) ABSTRACT

A data acquisition device includes a housing, a card reader, a scanner, an electronic signature pad, and a data communication system. The card reader, the scanner, and the electronic signature pad are integrated with the housing and with the data communication system. The data communication system is configured to receive the data that is read by the card reader, the scanner, and the electronic signature pad, and to communicate the received data to a computer connected to the data acquisition device. The computer processes the data acquired by the data acquisition device with appropriate software.

9 Claims, 2 Drawing Sheets

DATA ACQUISITION DEVICE

CROSS-REFERENCE TO RELATED APPLICATIONS

The present application is a continuation of application Ser. No. 10/995,841, filed Nov. 23, 2004 (now U.S. Pat. No. 7,311,258 B2, issued Dec. 25, 2007), entitled "Data Acquisition Device," which claims priority under 35 U.S.C. §119(e) to U.S. Provisional Application Ser. No. 60/524,749, entitled "Data Acquisition Device," filed Nov. 24, 2003. Both of these applications are incorporated herein by reference in their entirety.

BACKGROUND

Background

In many applications, a lot of information may have to be acquired from customers and/or other entities. The information is typically in the form of digitized data. In the retail industry, for example, information may have to be acquired for purposes such as customer identification and inventory management. In the health care industry, as another example, insurance data may be received from patients, and signatures may be received from the patients in connection with patient consent for charges and treatment. Photographs of the patients may also have to be received and stored, for identification purposes.

The amount of data that have to be processed for many transactions, as well as the variety of the sources of the data, and the variations in vendor and/or jurisdictional requirements when processing the data, may create challenges for these transactions.

SUMMARY

A data acquisition device may include a housing, a magnetic stripe card reader, an optical scanner, an electronic signature pad, and a data communication system. The magnetic stripe card reader, the optical scanner, and the electronic signature pad may be integrated with the housing and with the data communication system. The data communication system may be configured to receive the data that is read by the magnetic stripe card reader, the optical scanner, and the electronic signature pad, and to communicate the received data to a computer for further processing. The data acquisition device may also include a smart card reader, or other type of security device, which may also be integrated with the housing and with the data communication system.

A data processing system may include a data acquisition device, and a processor connected thereto. The data acquisition device may include a housing; a data communication system; a magnetic stripe card reader; an optical scanner; and an electronic signature pad. The magnetic stripe card reader, the optical scanner, and the electronic signature pad may all be integrated with the housing and the data communication system. The processor may be linked to the data communication system, and may be configured to receive data from the data communication system. The processor may be further configured to communicate with a database to determine whether the received data matches a record stored within the database, retrieve information in the record and process the information if there is a match, and generate a new record based on the received data and store the new record in the database, if there is not a match.

A method of inputting information into a computer may include swiping a card in a magnetic stripe card reader housed in a housing, and placing the card in an optical scanner housed in the same housing. The method may further include providing a signature onto an electronic signature pad housed in the same housing.

DETAILED DESCRIPTION

Figure 1:
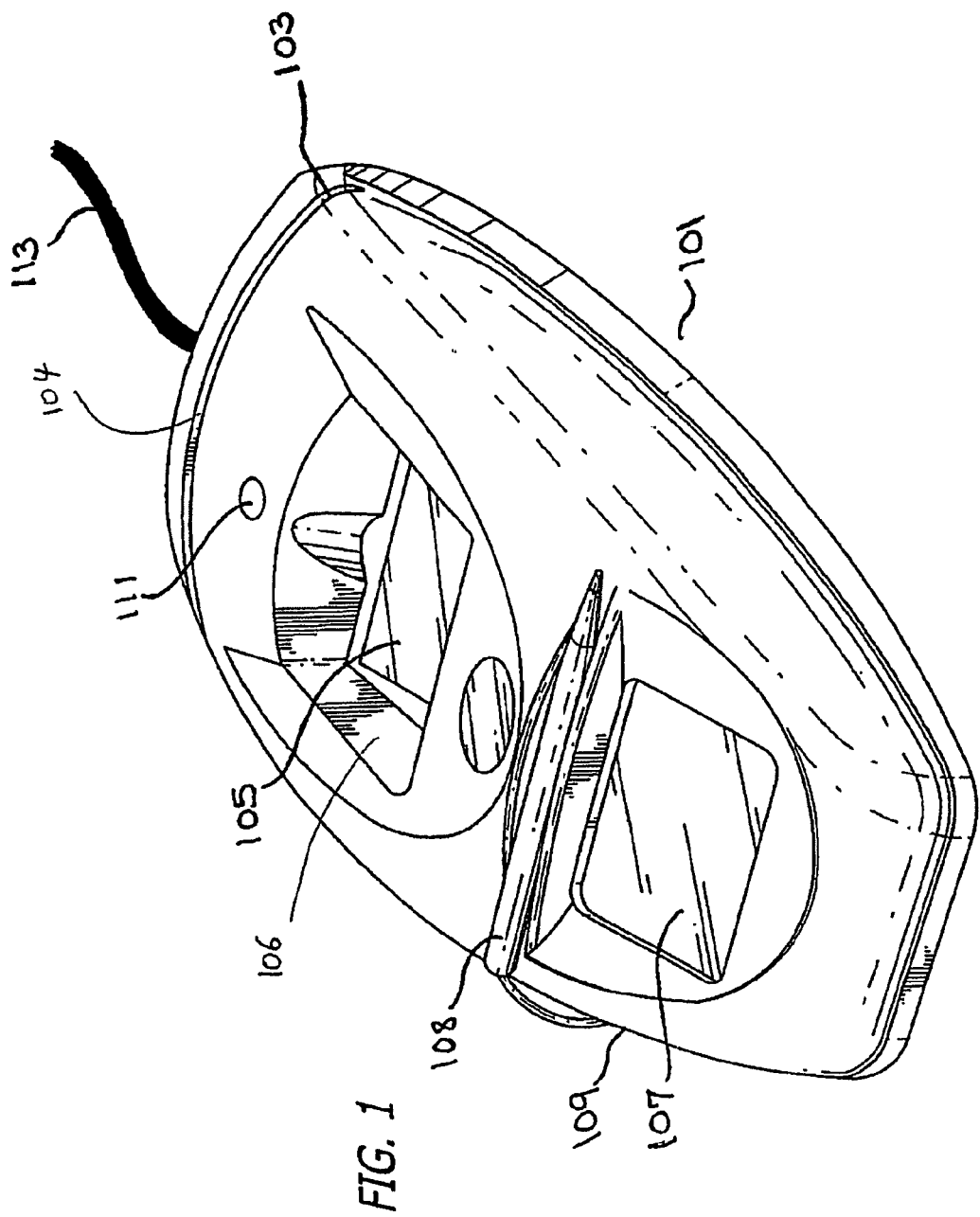
FIG. 1 illustrates an example of a data acquisition device.

FIG. 1 illustrates an example of a data acquisition device 100, which may allow different types of data to be acquired by a single integrated unit, and may transmit the acquired data to a computer for further processing by appropriate software in the computer. The data acquisition device 100 may include a case or housing 101; a magnetic stripe card reader 103; an optical scanner 105; and an electronic signature pad 107. The data acquisition device 100 may also include a data communication system (not shown) that may receive and transmit data that have been read by the different components of the data acquisition device 100.

The housing 101 may house all the components (103, 105, and 107) of the data acquisition device 100 together within a single integrated unit 100. The magnetic stripe card reader 103, the optical scanner 105, and the electronic signature pad 107 may all be integrated with the housing 101 and with the data communication system. By providing a single hardware unit that may be used to acquire different types of data, a significant increase in convenience and efficiency may be achieved. The housing 101 may be made of plastic, metal, or any other type of material known and used in the art when fabricating housing units for electronic components.

The data acquisition device 100 may also include a security device that restricts access to the data acquisition device 100 to authorized users only. In the embodiment illustrated in FIG. 1, the security device may be a smart card reader 109, although other embodiments of the data acquisition device 100 may include other security devices known in the art. In FIG. 1, the smart card reader 109 is shown as being integrated within the housing 101, although other embodiments of the data acquisition device 100 may include a smart card reader or other security device that is a separate hardware component.

The magnetic stripe card reader 103 may be configured to read a magnetic stripe on a card, while the card is swiped through a slot or groove 104 in the magnetic stripe card reader 103, as known in the art. In this embodiment, the magnetic stripe card reader 103 may define a groove 104 into which a card is slidably positionable. Because the magnetic stripe card reader 103 may be integrated with the housing 101, the groove may be formed or carved on a surface of the housing 101.

In other embodiments of the data acquisition device 100, the card reader 103 may be a card reader other than a magnetic stripe card reader, and may be configured to read different forms of information, i.e. information that is embedded a medium other than a magnetic medium, including but not limited to an optical storage medium. The magnetic stripe card reader 103 may be used to read data from a broad variety of cards, including but not limited to: drivers' licenses, health care cards, supermarket cards, bank cards and credit cards. An exemplary use of the magnetic stripe card reader 103 may be the acquisition of data relating to the identity of a customer. For example, the magnetic stripe card reader 103 may be used to capture user identity information that is provided on a driver's license issued by a state.

The optical scanner 105 may be configured to scan a card or other item as the card or item passes through a scan region. In one embodiment, the scan region may be defined by a window 106 of the scanner. In this embodiment, the optical scanner 105 scans the item being scanned if the item is placed within the window 106 of the scanner. The window 106 may be framed at least in part by a portion of the exterior surface of the housing 101.

The optical scanner 105 may be a photo scanner, for example, which scans and digitizes photographs such as a photograph in an ID (identification) card such as a driver's license. The optical scanner 105 may also function as a 2D bar code scanner, and scan a bar code label on a card or other item having the bar code label attached thereto. The optical scanner 105 may be connected to other software and/or hardware system or systems (not shown), which may process the image data from the images or photographs that are scanned (e.g. photographs of the card's owner). The other software and/or hardware may also or instead be configured to identify and decode the bar code and/or textual information on the item being scanned. For example, the optical scanner 105 may have the ability to use OCR (Optical Character Recognition) technology, known in the art, that may translate the image data that has been scanned in into ASCII characters. A scanner other than an optical scanner may be used, including but not limited to an infrared scanner and an acoustic scanner.

In the embodiment illustrated in FIG. 1, the data acquisition device 100 may include an activation switch 111 which may be used to activate the optical scanner 105. The activation switch 111 may be a simple button switch responsive to tactile pressure, for example, which may be turned "on" (switch "closed") or "off" by pressing on the button. In other embodiments, the scanner 105 may instead be automatically activated when a card or other item to be scanned is inserted within the window 106 or other scan region of the optical scanner 105, such as by virtue of a sensor switch that senses the presence of the card within the scan region. Other means of activating the scanner, known in the art, may also or instead be employed. For example, the mere presence of data may cause the scanner 105 to be activated.

The electronic signature pad 107 may be configured to receive a signature and digitize the signature, as known in the art. The electronic signature pad 107 may be rigidly affixed to a surface of the housing 101. The data acquisition device 100 may include a stylus 108, which may be used by a user to apply a signature to the signature pad 107. The electronic signature pad 107 may be configured to create an electronic image of the signature that is written on the signature pad. The electronic signature pad 107 may further include an LCD display on which the signature is written. The LCD display may be integrated with the electronic signature pad 107, or may be a separate component. The LCD display may be connected to a processing system (not shown), which may be configured to cause the LCD display to display information that is pertinent to the signature, such as information about why the signature is being requested (e.g., "sign here to accept"), information about how to use the signature pad or other aspects of the data acquisition device 100, virtual buttons for the user to press (e.g., "accept" and "cancel"), or any other type of information.

The signature pad 107 may be a signature pad other than an electronic signature pad, including but not limited to an optically activated signature pad, and a magnetically activated signature pad.

The smart card reader 109 may be a login card reader whose function is to ensure that only the users with the proper cards are allowed to access and add customer information. The smart card reader 109 may be configured to communicate with a smart card, and may be configured in connection with other software/hardware systems to prevent the data acquisition device 100 and/or a computer with which the device 100 is associated from being used in the absence of an authorized smart card being inserted in the smart card reader 109. As well known in the art, smart cards greatly improve the convenience and security of transactions by providing tamper-proof storage of user identity, and have embedded computer chips that can store and process data. Appropriate encryption technology may be used to protect the security and confidentiality of the information that is acquired by the data acquisition device 101.

The data communication system in the data acquisition device 100 may receive the different types of data read by the magnetic stripe card reader 103 and/or the optical scanner 105 and/or the electronic signature pad 107, and transmit the received data to a computer for further processing. The data communication system may thus include appropriate hardware and software relating to a transmitter, a receiver, and a transmission channel. In an embodiment in which the data acquisition device 100 is configured to communicate with an associated computer by wireless means, the data communication system may include a wireless component.

In one embodiment, the data communication system may include a USB (Universal Serial Bus) interface (not shown), through which the magnetic stripe card reader 103, the optical scanner 105, the electronic signature pad 107, and the smart card reader 109 may communicate. The USB interface may considerably facilitate the communication between the various electronic components (103, 105, 107, and 109). The magnetic stripe card reader 103, the optical scanner 105, the electronic signature pad 107, and the smart card reader 109 may all be configured with a USB interface, i.e. all the peripheral components (103, 105, 107, and 109) of the data acquisition device 100 may be USB devices.

The electronic components (103, 105, 107, and 109) of the data acquisition device 100 may communicate over a single cable 113, or over multiple cables. In an embodiment in which all the components of the data acquisition device 100 are USB devices, the data communication system may include a USB hub (not shown) into which each of the USB devices may be plugged, thus allowing all of the components to communicate over a single USB cable.

The data acquisition device 100 may include one or more components other than the magnetic stripe card reader 103, the optical scanner 105, the electronic signature pad 107, and the smart card reader 109 described above. For example, components of the data acquisition device 100 may include, but are not limited to: a fingerprint reader (not shown); a wireless receiver or transceiver (not shown) for receiving and/or transmitting information to a remote device such as a PDA (Personal Digital Assistant); a sound generator (not shown) such as a loudspeaker; a microphone; a camera; and a transponder for receiving an identification code from an RFID (radio frequency identification) tag that may be brought in proximity to the data acquisition device 100. The data acquisition device 100 may include all of the foregoing components, many of the foregoing components or only some of the foregoing components, in any combination.

Figure 2:
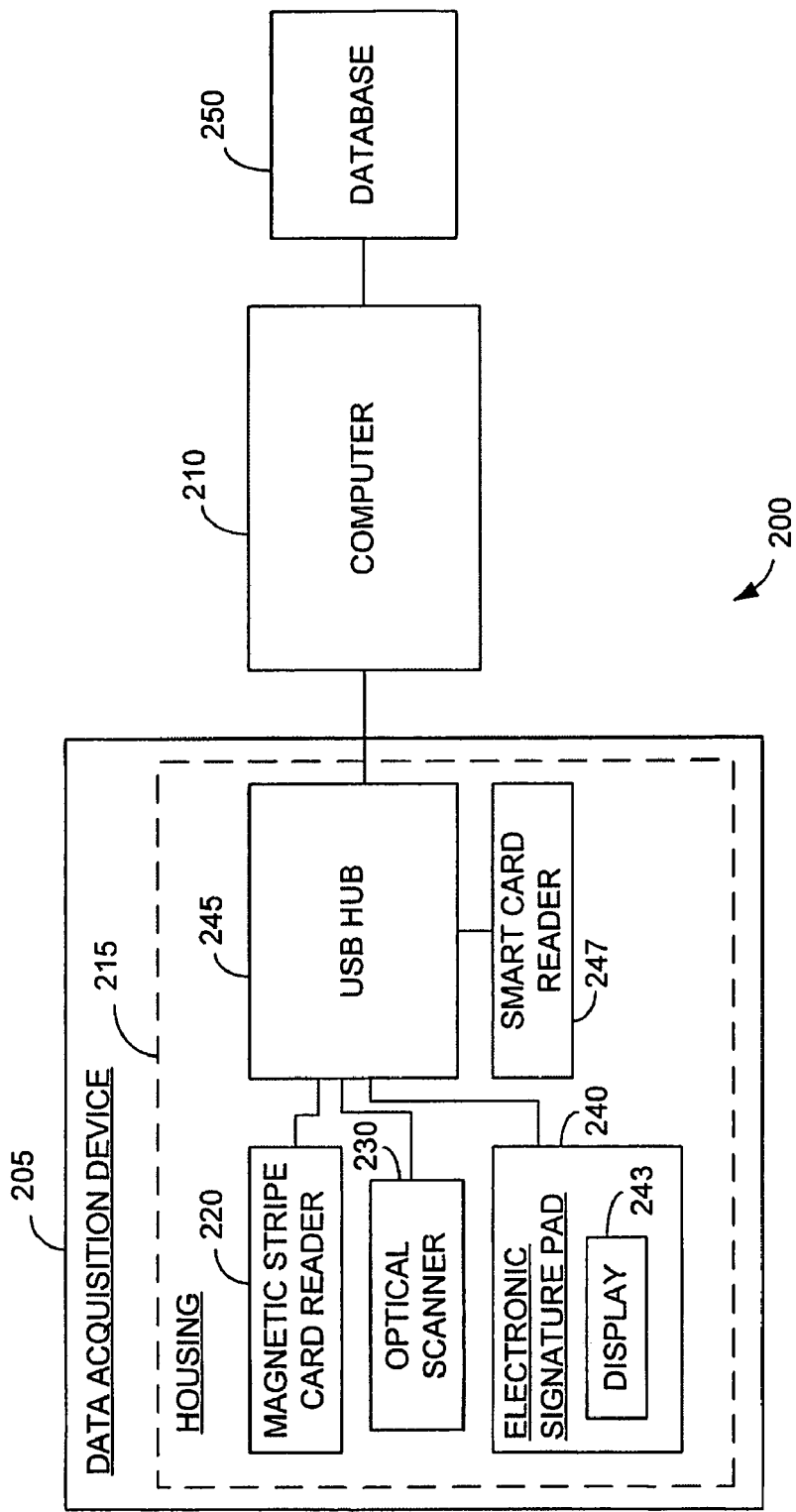
FIG. 2 is a schematic block diagram of a data processing system.

The data acquisition device may be connected to an associated computer that processes the data acquired by the data acquisition device. FIG. 2 is a schematic block diagram of a data processing system 200 that includes a data acquisition device 205, and a computer 210 that processes the data acquired by the data acquisition device 205. The data acquisition device 205 may include a housing 215, a magnetic stripe card reader 220, an optical scanner 230, an electronic signature pad 240 having an LCD display 243, a USB hub 245, and a data communication system (not shown), all of which have been already described in connection with FIG. 1. As explained with reference to FIG. 1, the magnetic stripe card reader 220, the optical scanner 230, and the electronic signature pad 240 may be integrated with the housing 215 and the data communication system, and may be plugged into the USB hub 245, which allows all of the components to communicate over a single USB cable. As explained with reference to FIG. 1, the data acquisition device 200 may also include a security device such as a smart card reader 247. The data acquisition device 100 may be connected to the computer 210 over a USB cable, over another type of cable, over a wireless connection, or through any other means known in the art.

The computer 210 may include a display, a printer, a keyboard, a mouse, and/or other devices or any combination of them, well known in the art. The computer 210 may be a stand-alone computer or may be configured as part of a network. The network may be a LAN (Local Area Network), WAN (Wide Area Network), MAN (Metropolitan Area Network), the Internet, another type of network or any mixture of these types of networks. The components in the network may be wired together, may communicate wirelessly or may include a combination of these types of connections. In an embodiment in which the network is a LAN, the network components may communicate with each other using the Ethernet protocol.

The computer 210 may include appropriate drivers to interface with the components in the data acquisition device 205, such as a driver for the magnetic card stripe reader 220, the optical scanner 230, the electronic signature pad 240, and the smart card reader 247, respectively. As described earlier, the optical scanner 230 may include an activation switch, and the computer 210 may further include a driver for the optical scanner activation switch. The drivers may be configured to receive and/or deliver appropriate data and other signals as may be needed or desired in connection with the application(s) to which the data acquisition device 205 is associated.

While processing the data received from the data acquisition device 205, the computer 210 may consult a database 250. The computer 210 may, for example, compare the data acquired by the data acquisition device 205 with a record stored within the database 250. Based on the result of the comparison, the computer 210 may retrieve the record for further processing, or create a new record based on the data received from the data acquisition device 205.

The computer 210 may be programmed with appropriate application software to communicate with the components of the data acquisition device 205 and to receive and process information from the data acquisition device 205. The computer 210 may include software configured to provide a broad array of functions to the user. The data processing system 200 thus allows different types of data to be gathered by a single piece of hardware 205, which integrates a number of different data-gathering peripheral components into a single unit. The data processing system 200 further allows the different types of data to be funneled into a desired and/or custom-built software that may be configured to provide a wide variety of functions and to serve many different purposes.

The software in the computer 210 may be configured to automatically receive and process information from the data acquisition device, regardless of the state of the software's operation and without any pre-conditioning or pre-setting by the user of the computer. Rather, the mere swiping of a card, pressing of the button, insertion of a smart card, or contact with the signature pad may itself initiate and open up the communication. The software described above may reside in RAM (Random Access Memory), flash memory, ROM (Read-Only Memory), EPROM (Erasable Programmable Read-only Memory), EEPROM (Electrically-Erasable Programmable Read-only Memory), registers, hard disk, a removable disk, a CD-ROM, or any other form of storage medium known in the art. A storage medium may be coupled to the computer 210 such that the computer 210 can read information from, and write information to, the storage medium. In the alternative, the storage medium may be integral to the computer 210.

In operation, the data acquisition device may be used in connection with a broad variety of applications, such as in connection with the automotive, health care, banking or retail vertical markets. The data acquisition device may also be used generally as a device in the computing field.

As one example, the data acquisition device may be used in the automotive market. In this exemplary process of using the data acquisition device, a driver's license containing a magnetic stripe may be swiped through the magnetic stripe card reader. The information on the magnetic stripe of the card may then be read and delivered to and processed by an associated computer connected to the data acquisition device.

If the data acquisition device is equipped with a smart card reader, a smart card may then be connected to the smart card reader. Following appropriate communication with an associated computer, the data acquisition device and/or the associated computer may then be switched into a mode for further operation. If an authorized smart card is not inserted, on the other hand, the data acquisition device and/or the associated computer may be locked against any further input or output.

The driver's license may also or instead be placed in the window of the optical scanner. The optical scanner activation switch may then be depressed, causing the optical scanner to operate. Alternatively, the optical scanner may operate automatically if the data acquisition device is configured with an appropriate sensor. The image that is scanned may be processed to extract a bar code, textual information and/or a photograph. All of this information may be delivered to the associated computer for processing and/or storage.

The user may also be prompted to enter his social security number. Such a prompt may appear on the screen of the associated computer, through a loudspeaker, and/or on the display portion of the electronic signature pad. The social security number, in turn, may be entered on the electronic signature pad, either by writing the numbers or by selecting from a menu that is displayed on the display portion of the electronic signature pad. The social security number may also be entered through a keyboard associated with the computer, on a touch screen associated with the computer, and/or through other means.

A prompt may then be provided to the user asking the user to enter his signature on the electronic signature pad using the stylus. Information may be displayed on the electronic signature pad at the same time. For example, a prompt to provide the signature may appear, or information about the meaning of the signature may be displayed. Buttons to be depressed alongside of the signature, such as "accept" or "cancel", may also appear.

While processing the data from the data acquisition device, the computer may consult a database to compare data see if a record can be found that corresponds to the identity of the customer, as revealed by the input to the data acquisition device. If such a record can be found, stored information in that record may be added to the computing process. If such a record cannot be found, on the other hand, the computing system may be configured to automatically generate a new record for the new customer and to store this new record in the database, all without any prompting and/or confirmation steps.

The information that is received from the data acquisition device and/or the database may automatically be used to populate one or more forms that may be used in connection with the software application.

Following the receipt of the information, including possibly a signature, appropriate operations may then be performed. For example, the customer may be asked to provide a signature authorizing a credit check, following which a credit check may be performed. The customer may in addition or instead be asked to authorize the storage and use of the customer information that he provides, which, again, may be stored and used following receipt of his authorizing signature. The customer may be asked to select a vehicle of interest, and/or to enter any trade in information, so that automotive dealership personnel can initiate appropriate sales or trade-in transactions.

In the health care industry, as another example, the data acquisition device may be used in a hospital or doctor's office or anywhere else. It may be configured to receive insurance information, and to request and receive signatures relating to consent for charges, treatment or the use of patient information. It may also be configured to scan and store a photograph of the patient, and to receive and store a signature of the patient for identification purposes.

In the banking industry, as another example, the data acquisition device may be used in a bank, at a retail store, in association or as part of an ATM (Automatic Teller Machine), or elsewhere. The device may be configured to receive a bank card and to process transactions in connection with that card. The device and associated computer may also be configured to receive and store a signature and/or a photograph for later identification purposes.

In connection with retail sales, as another example, the data acquisition device may be used in a retail store, such as at the check-out counter. The various components of the data acquisition device may cooperate to facilitate the identification of the customer, the allocation of charges to the customer's account, to receive payment, and to obtain customer consent for the transaction(s). The data acquisition device may be used for other retail purposes, such as inventory management.

In the computing field, the data acquisition device may be used as a generic device for computing. In this event, its exact function may be dependent upon one or more software applications that are written for the computing system, such as one or more of the applications discussed above.

In sum, a data acquisition device has been described that integrates a plurality of information-gathering peripheral devices into a single piece of hardware, and allows the different types of gathered data to be channeled into a software bundle that can be programmed for myriad functions. In this way, the data acquisition device offers increased convenience to users, and considerably increases the efficiency of business operations.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. .sctn.112, sixth paragraph, unless the element is expressly recited using the phrase "means for" or, in the case of a method claim, the element is recited using the phrase "step for."

We claim:

1. A data acquisition device for acquiring data to be processed by a computer, comprising:
   a housing;
   a data communication system linked to the computer;
   an image capture device integrated with the housing and the data communication system; and
   an electronic signature pad integrated with the housing and the data communication system;
   wherein the data communication system includes a USB hub connected to the image capture device and the electronic signature pad, and wherein the USB hub is integrated with the housing.

2. The data acquisition device of claim 1 further comprising an activation switch configured to activate the image capture device when in a closed state, and to de-activate the image capture device when in an open state, and wherein the activation switch is integrated with the housing.

3. The data acquisition device of claim 1 wherein the image capture device includes a window, and wherein the window is framed at least in part by a portion of a surface of the housing.

4. A data acquisition device for acquiring data to be processed by a computer, comprising:
   a housing;
   a data communication system linked to the computer;
   an image capture device integrated with the housing and the data communication system;
   an electronic signature pad integrated with the housing and the data communication system; and
   an activation switch configured to activate the image capture device when in a closed state, and to de-activate the image capture device when in an open state, and wherein the activation switch is integrated with the housing.

5. The data acquisition device of claim 4 wherein the data communication system includes a USB hub connected to the image capture device and the electronic signature pad, and wherein the USB hub is integrated with the housing.

6. The data acquisition device of claim 4 wherein the image capture device includes a window, and wherein the window is framed at least in part by a portion of a surface of the housing.

7. A data acquisition device for acquiring data to be processed by a computer, comprising:
   a housing;
   a data communication system linked to the computer;
   an image capture device integrated with the housing and the data communication system; and
   an electronic signature pad integrated with the housing and the data communication system;
   wherein the image capture device includes a window, and wherein the window is framed at least in part by a portion of a surface of the housing.

8. The data acquisition device of claim 7 wherein the data communication system includes a USB hub connected to the image capture device and the electronic signature pad, and wherein the USB hub is integrated with the housing.

9. The data acquisition device of claim 7 further comprising an activation switch configured to activate the image capture device when in a closed state, and to de-activate the image capture device when in an open state, and wherein the activation switch is integrated with the housing.

* * * * *